United States Patent
Beredimas et al.

(10) Patent No.: US 11,831,758 B2
(45) Date of Patent: Nov. 28, 2023

(54) CONFIGURATION OF HEADLESS NETWORK APPLIANCES

(71) Applicant: Citrix Systems, Inc., Fort Lauderdale, FL (US)

(72) Inventors: Ioannis Beredimas, Salonika (GR); Snigdhendu Mukhopadhyay, San Jose, CA (US); Adam Phillip Schultz, Apex, NC (US)

( * ) Notice: Subject to any disclaimer, the term of this patent is extended or adjusted under 35 U.S.C. 154(b) by 0 days.

(21) Appl. No.: 17/868,909

(22) Filed: Jul. 20, 2022

(65) Prior Publication Data
US 2022/0353065 A1 Nov. 3, 2022

Related U.S. Application Data

(63) Continuation of application No. 17/170,175, filed on Feb. 8, 2021, now Pat. No. 11,431,482, which is a continuation of application No. PCT/GR2021/000008, filed on Jan. 26, 2021.

(51) Int. Cl.
*H04L 9/40* (2022.01)
*H04L 9/08* (2006.01)
*H04L 41/0806* (2022.01)

(52) U.S. Cl.
CPC ............ *H04L 9/0825* (2013.01); *H04L 9/085* (2013.01); *H04L 9/0877* (2013.01); *H04L 41/0806* (2013.01)

(58) Field of Classification Search
CPC ...... H04L 9/0825; H04L 9/085; H04L 9/0877
See application file for complete search history.

(56) References Cited

U.S. PATENT DOCUMENTS

| | | | |
|---|---|---|---|
| 6,892,305 B1 | 5/2005 | Dayan et al. | |
| 8,869,236 B1 | 10/2014 | Tonogai et al. | |
| 10,855,674 B1 * | 12/2020 | Geusz | H04L 63/20 |
| 2008/0222714 A1 | 9/2008 | Wahl | |
| 2011/0246773 A1 | 10/2011 | Sidle et al. | |
| 2011/0261964 A1 * | 10/2011 | Kahler | H04L 9/083 380/44 |
| 2011/0302415 A1 | 12/2011 | Ahmad et al. | |

(Continued)

OTHER PUBLICATIONS

International Search Report and Written Opinion dated Sep. 30, 2021 for Application No. PCT/GR2021/000008 filed Jan. 26, 2021; pp. 12.

*Primary Examiner* — Thaddeus J Plecha

(57) ABSTRACT

A system and method for securely encrypting and booting a headless appliance. A method includes providing the headless appliance with content stored in a memory, wherein the content is encrypted with a key, and wherein the key is separately stored on a remote computing device; booting the headless appliance and loading a fallback configuration; in response to a user device connecting to the headless appliance, directing the user device to a captive portal and capturing credentials of a user; forwarding the credentials to the remote computing device for verification by an identity provider; in response to the credentials being verified as a non-administrator, granting access to a public network for the user; and in response to the credentials being verified as an administrator, obtaining the key from the remote computing device to decrypt the content to provide access to a private network for the user.

20 Claims, 8 Drawing Sheets

(56) References Cited

U.S. PATENT DOCUMENTS

| | | |
|---|---|---|
| 2014/0101426 A1* | 4/2014 | Senthurpandi .......... G06F 21/32 |
| | | 713/1 |
| 2017/0149564 A1 | 5/2017 | McCallum |
| 2018/0204007 A1 | 7/2018 | Rangayyan |
| 2018/0217847 A1* | 8/2018 | Katchapalayam ........ H04L 9/14 |
| 2020/0213191 A1* | 7/2020 | Watsen ............... H04L 61/5014 |
| 2021/0117546 A1 | 4/2021 | Finchelstein et al. |

* cited by examiner

CONFIGURATION OF HEADLESS NETWORK APPLIANCES

BACKGROUND OF THE DISCLOSURE

Disk encryption typically relies on an encrypted secret key that is used to protect the data stored on a system. Strong cryptographic methods are then used to encrypt this secret key with "trust factors" that are required to decrypt the secret key and the associated data it protects. Typical trust factors include a passphrase that needs to be entered on system boot, authentication of a user with sufficient privileges, a decryption key stored in an external universal serial bus (USB) key, a trusted network that the appliance is connected to which provides access to a "decryption server," a Trusted Platform Module (TPM) chip, a Global Positioning System (GPS) beacon which can validate that the appliance is at the expected location and has not moved, a Bluetooth Low Energy (BLE) beacon which can provide a similar function to GPS, a fingerprint based unlock mechanism, etc. Sophisticated systems can facilitate a combination of such trust factors.

BRIEF DESCRIPTION OF THE DISCLOSURE

Aspects of this disclosure provide a system and method for encrypting content on headless network appliances to manage and control their capabilities in response to a boot process.

A first aspect of the disclosure provides an appliance that includes a memory configured to store content, the content being encrypted with a key before deployment of the appliance, and the key being separately stored on a remote computing device. Also included is a processor coupled to the memory and configured to boot the appliance according to a method that includes: initiating operation of the appliance in which the appliance allows establishment of connectivity with a network to communicate with the remote computing device and disallows access to a secure computing environment. The method further includes receiving the key from the remote computing device in response to (i) establishment of trust between the appliance and the remote computing device and (ii) authentication of a user; and modifying operation of the appliance to allow the appliance to access the secure computing environment upon decryption of the content with use of the key.

A second aspect of the disclosure provides a computerized method for booting an appliance. The method includes providing the appliance with content stored in a memory, wherein the content is encrypted with a key, and wherein the key is separately stored on a remote computing device. The method further includes initiating operation of the appliance in which the appliance allows establishment of connectivity with a network to communicate with the remote computing device and disallows access to a secure computing environment; receiving the key from the remote computing device in response to (i) establishment of trust between the appliance and the remote computing device and (ii) authentication of a user; and modifying operation of the appliance to allow the appliance to access the secure computing environment upon decryption of the content with use of the key.

A third aspect discloses an appliance that includes a memory configured to store content encrypted with a key, the key being separately stored by a security service and a processor coupled to the memory and configured to boot the appliance according to a method. The method includes: initiating operation of the appliance in a fallback configuration in which the appliance allows establishment of connectivity with a network to communicate with the security service and blocks operations that require content encrypted with the key; receiving the key from the remote computing device in response to (i) establishment of trust between the appliance and the security service and (ii) authentication of a user by an identity provider; and decrypting the content with the key to allow the operations on the appliance that require the content.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
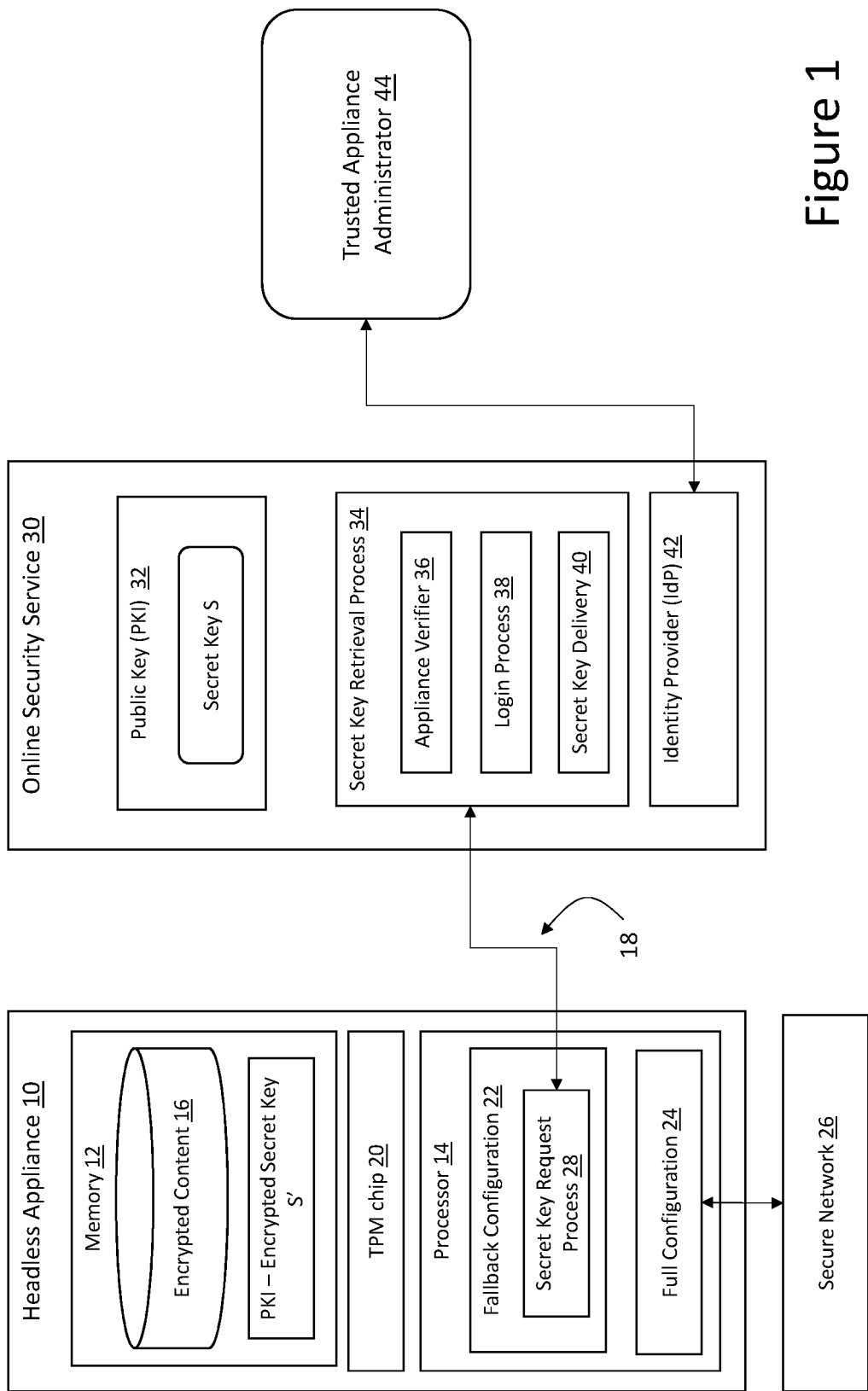
FIG. 1 depicts an illustrative architecture for implementing a secure headless appliance, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure include technical solutions for encrypting content on headless network appliances to manage and control appliance capabilities in response to a boot process. As noted, network appliances can utilize any number of encryption systems to limit and control operations of appliance. However, existing security protocols are either poorly suited or not sufficient for headless network appliances.

Headless network appliances typically come with specialized hardware and software, which generally do not include a user interface and often do not provide capabilities like GPS and Bluetooth. Because such appliances are headless, a user login or other user intervention to implement a boot process are typically not involved. Instead, such appliances are designed to self-boot when powered on or repowered after a power failure. Requiring user intervention could result in a poor user experience since the appliance and any network capabilities would remain offline until a user realizes intervention is needed. Accordingly, if a temporary power failure occurs in the middle of the night, it may be many hours before the appliance is brought back online even though the appliance may be needed to perform automated functions during that time.

Furthermore, providing actions such as access to a secure network by the appliance during a boot process is complicated by the headless nature of the appliance. For example, the appliance may reside at a remote corporate location that has temporarily lost its connection to the corporate network and/or the appliance may be the responsible for establishing (e.g., via a VPN) connection to the corporate network. Such a scenario introduces a catch-22 problem, i.e., access to the corporate network is required for decryption of content on the appliance, however decryption is required for the appliance to boot and connect to the corporate network. While the use of external add-ons such as a USB key holding the decryption key may be utilized, such approaches also suffer from poor user experience (e.g., someone needs to manually plug the key on every reboot) or do not provide adequate security (e.g., the USB key may be misplaced or stolen, or left plugged in).

TPM chips can provide some level of protection by preventing content from being decrypted unless installed on the intended appliance. However, in the case of headless network appliances, Trusted Platform Module (TPM) chips can only provide a layer of defense, since they do not sufficiently protect against appliance theft. For example, a malicious actor could steal the appliance, boot it and then, in case it provides some sort of VPN connectivity to the corporate network via LTE, connect and gain access to the corporate network, even if the actor cannot access the data on the appliance itself.

The present embodiments provide techniques for securing headless appliances, which include variants frequently employed with disk encryption of non-headless appliances, such as corporate laptops, servers connected to a corporate network, etc. The solutions described herein may be implemented: without physical user interaction, such as insertion of USB key, typing in a passphrase or logging in the appliance; without installation of specialized hardware on the network appliance, such as a TPM, Bluetooth or GPS chip, coupled with software to leverage the hardware; or without appliances being pre-connected to a corporate or otherwise secure network.

FIG. 1 depicts an illustrative architecture for implementing a secure headless appliance 10 that includes encrypted content 16 required to fully implement operations of the appliance 10. In this approach, decryption of content 16 relies on a combination of: (1) providing Internet access during appliance boot; (2) an initial establishment of trust between the headless appliance 10 and an online security service 30 that can decrypt an encryption key (i.e., secret key S) using PKI 32; and (3) an identity provider 42 that can strongly authenticate one or more trusted appliance administrators 44.

During the appliance manufacturing process a key (e.g., a secret key S) is used to encrypt the disk contents of the appliance, i.e., encrypted content 16 stored in memory 12. The secret key S is subsequently stored on the online security service ("online service") 30 protected by another form of encryption, for example public key cryptography (PKI 32) in which the secret key S is encrypted with the online service's public key 32. The secret key S is stored on the online service 30, whereas the encrypted version S' is stored on the appliance 10. Encryption of content 16 with secret key S may for example utilize a symmetric algorithm such as advanced encryption standard (AES), which allows encrypted data to be processed quickly. Encryption of the secret S to generate S' is done a public key using asymmetric cryptography, e.g., RSA.

The online service 30 can be reached through the Internet 18 rather than via a secure computing environment such as secure network 26. This prevents the catch-22 problem outlined above in which the headless appliance 10 provides access to the secure network 26 and also relies on the secure network 26 for decryption. Namely, because a headless appliance does not provide a user login screen to obtain access to a secure network, the appliance may need access to a secure network in order be authenticated. This however opens the door to potential security breaches.

Upon boot, processor 14 in the appliance 10 loads a fallback configuration 22. The fallback configuration provides only basic functionality and Internet connectivity to connected entities, such as online service 30. Basic functionality may for example include WiFi capability, access to a set of routines or scripts to access the Internet, access to routines or scripts to request the secret key S from the online service 30, etc. Regular functionality provided by a full configuration 24 is blocked until the appliance 10 can retrieve the secret key S and decrypt content 16. Accordingly, any sensitive functions, such as access to secure network 26 offered by the appliance 10, are not implemented in the fallback configuration 22, and are thus unavailable to the appliance until implementation of the full configuration 24. Blocking the full configuration 24 occurs by encrypting data or code required to perform secure operations. For example, access to the secure network 26 could be blocked until a destination address is decrypted with secret key S. Similarly, routines or scripts for running other functions, e.g., input/output operations, wake-up operations, etc., would be unavailable until the encrypted content 16 is decrypted, thereby unblocking such operations.

As part of the fallback configuration 22, a key request process 28 can be implemented in which the headless appliance 10 requests the key (e.g., a secret key S) from the online service 30, which is handled by a key retrieval process 34 by the service 30. Process 34 may include an appliance verifier 36 that authenticates the appliance 10 (e.g., based on the encrypted secret key S'), a login process 38, and a key delivery 40. Retrieval process 34 may be triggered synchronously as part of the boot process (e.g., via a push notification mechanism) or asynchronously, e.g., when a user tries to connect to the secure network 26 or other sensitive resource protected by the appliance 10.

As noted, one or more trusted appliance administrators 44 are configured for the appliance 10. Towards this end, an Identity Provider (IdP) 42 is leveraged when a retrieval process 34 is implemented to provide multi-factor authentication, e.g., by contacting the administrator 44 and requesting authentication. An IdP stores and manages users' digital identities, and can check user identities via username-password combinations and other factors, or it may simply provide a list of user identities that another service provider checks. The IdP 42 functionality may be provided either by the service 30 hosting the secret key S or a third party service (not shown).

Once a user establishes their identity as a trusted appliance administrator 44, the online service 30 can provide the key (e.g., a secret key S) to the appliance 10. Once received, the appliance 10 uses the key to decrypt the content 16 allowing the appliance 10 to run in the full configuration 24, unlocking its full capabilities including, e.g., access to the secure network 26 and/or other sensitive resource. As noted, encrypted content 16 may include data or code needed to run certain operations, e.g., an address, a routine, a script, etc.

The described approach accordingly alleviates the issues identified herein. Namely, the online service 30, which provides the secret key S, can be readily accessed through the Internet 18, eliminating the need for access to the secure network 36 or manual action on the part of a user or administrator. Accordingly, no access to specialized hardware or a secure network is needed, although a TPM chip may be implemented on the appliance 10 as an extra security layer. It is also noted that the involvement of an IdP 42 and standard login methods, e.g., a captive portal or push notifications sent to a mobile phone, allows strong validation of a user trusted to unlock the appliance 10, without requiring physical access to it to initiate a login process.

Figure 2:
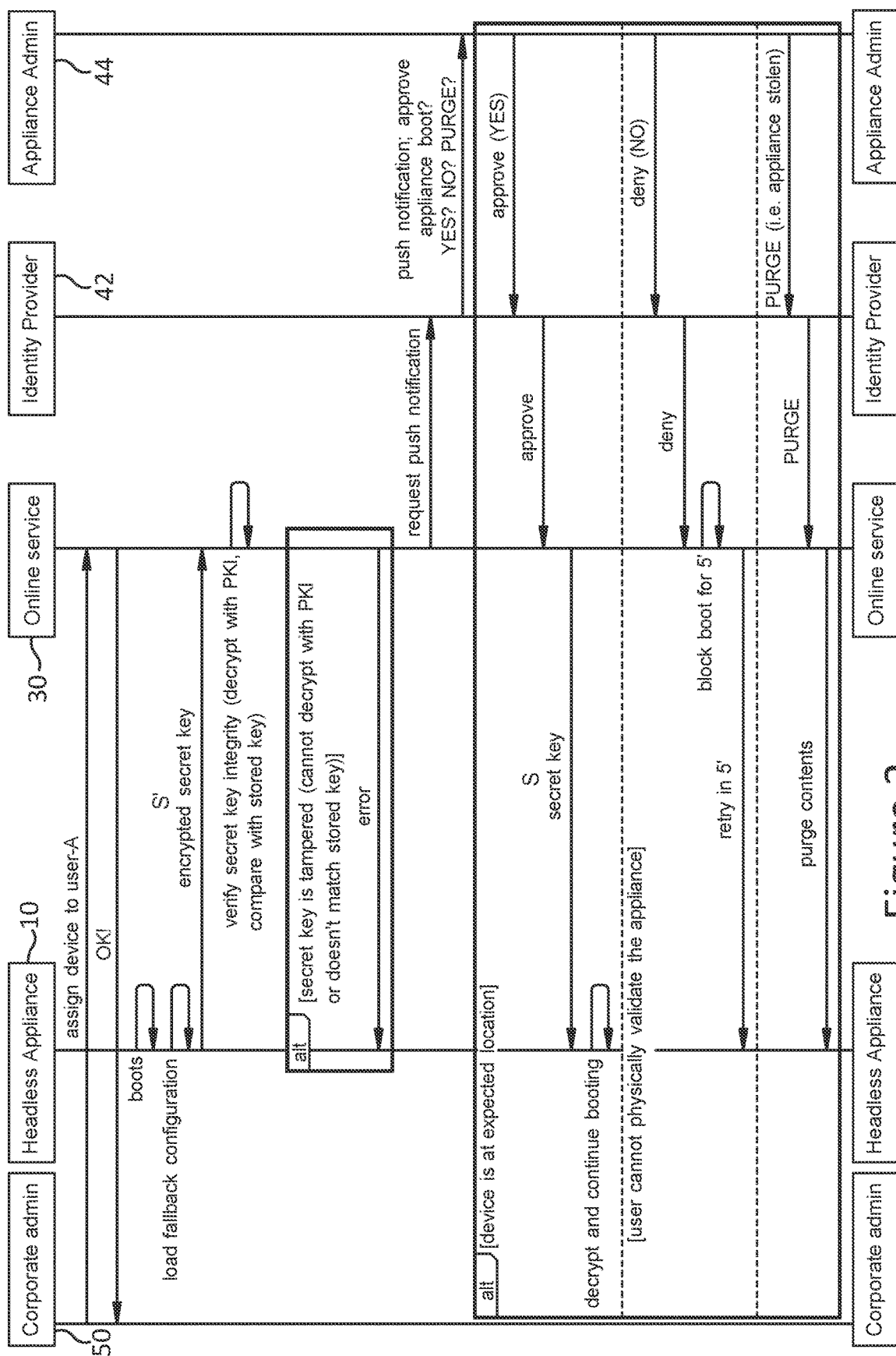
FIG. 2 depicts a flow diagram of a process for implementing and booting a secure headless appliance, in accordance with an illustrative embodiment.

FIG. 2 depicts an illustrative process flow for the architecture of FIG. 1. Initially, a corporate administrator 50 or the like assigns a headless appliance 10 to a user via the online service 30, who becomes a trusted appliance administrator 44. At some point, the appliance 10 boots and loads the fallback configuration 22, which causes the encrypted key (e.g., a secret key S') to be forwarded to the online service 30 as part of the request process 28. The encrypted key is then verified at the online service 30, by decrypting the key with PKI and comparing it to the stored key on the appliance. If the two do not match, an error is returned to the appliance 10, e.g., indicating tampering or the like. If the verification is successful, the request process 28 is pushed to the identity provider 42, which contacts the appliance administrator 44 to further authenticate/approve the appliance boot process.

When the appliance administrator 44 receives a request to authenticate/approve the appliance boot, the appliance administrator 44 can if necessary physically investigate the appliance status, e.g., making sure it is in the expected location, but does not need to actually interact with the appliance. Assuming, approval is provided by the appliance administrator 44, the key (e.g., a secret key S) is sent to the headless appliance 10 by the online service 30. In turn, the appliance decrypts the encrypted content 16 with use of the received key so as to allow the appliance 10 to boot in full configuration 24. Alternately, if the appliance administrator 44 cannot currently determine the appliance status, the appliance administrator 44 may simply deny the process from continuing with decryption, until such a time when the appliance administrator 44 can be certain of the status. Alternatively, if no response is forthcoming by the administrator 44, the boot process may be blocked for a period of time (e.g., five minutes), after which it may be retried or otherwise terminated. In the case where the appliance administrator 44 believes there has been appliance theft or tampering, e.g., a seal protecting the appliance enclosure is broken, the appliance administrator 44 can respond with a "purge" decision, so that all sensitive encrypted content 16 on the appliance 10 is purged.

Figure 3:
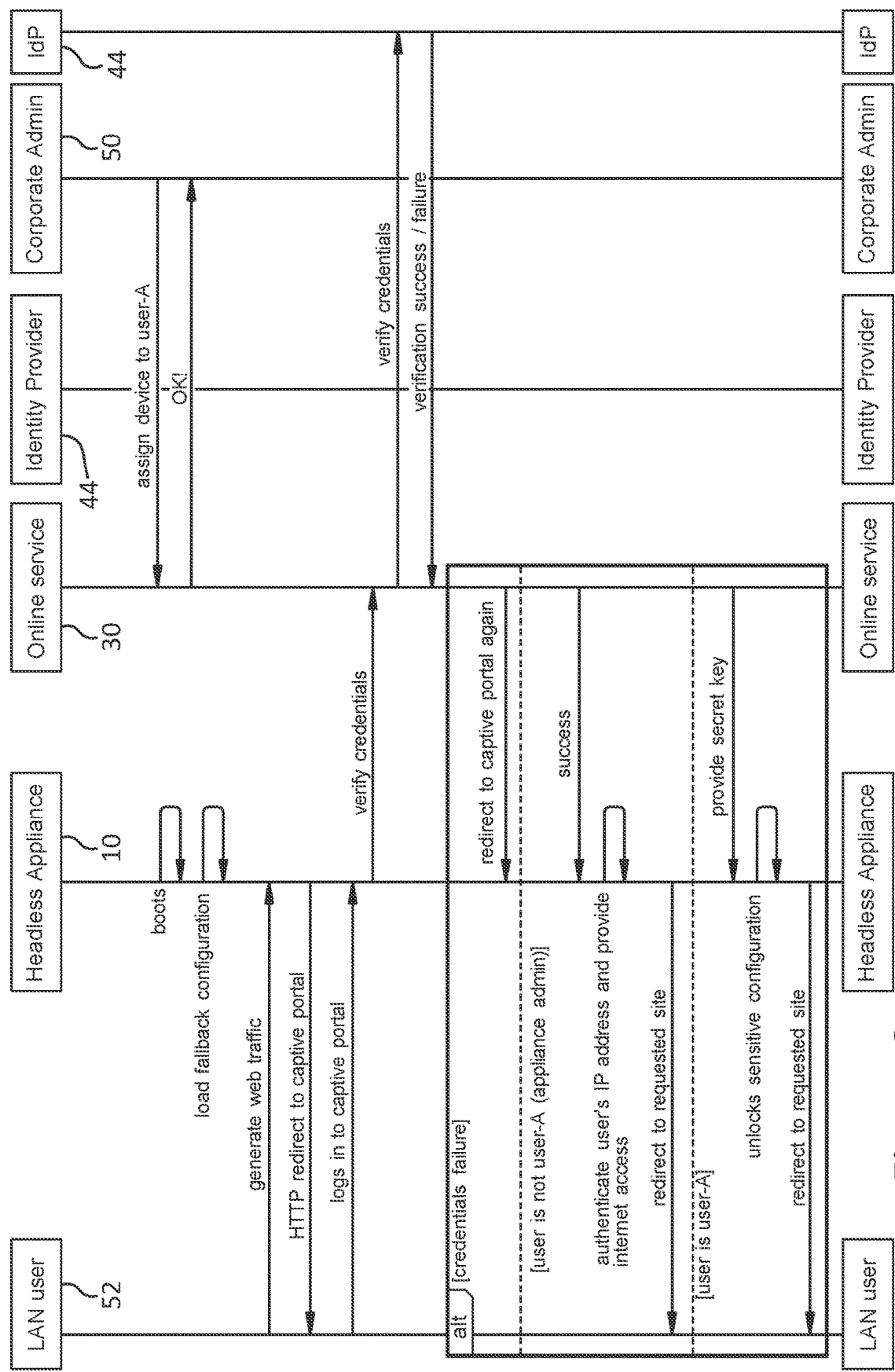
FIGS. 3-6 depict flow diagrams of alternative processes for implementing and booting a secure headless appliance, in accordance with illustrative embodiments.

FIG. 3 depicts an alternate flow involving an asynchronous use case in which decryption of the content is delayed until the user actually interacts with the appliance 10. In the provided flow, the appliance 10 is not unlocked synchronously as part of the boot process, but instead through asynchronous user intervention. In this case, users are prompted to verify their identity through a captive portal which determines if the user should be granted access to the router and/or authenticated as a VPN user. In this case, unauthenticated users who provide proper identity can still access the Internet, but are not allowed to access the VPN. A captive portal may for example comprise interstitial web pages, e.g., used by hotels, in which a user needs to present some valid credentials (e.g., last name and room number) before being able to connect. In this case, the fallback configuration is the ability to connect to the Internet via the captive portal, whereas full VPN access to a secure network is accomplished with an admin user login.

As shown in FIG. 3, the corporate administrator 50 assigns the appliance 10 to an appliance administrator 44 (not shown). During boot, the appliance 10 is loaded or otherwise configured to execute in the fallback configuration 22, which for example allows a local area network (LAN) user 52 (i.e., a user connected to a headless router via a LAN) to interact with the Internet via the headless appliance 10. The appliance 10 redirects the user 52 to a captive portal to allow an identified user 52 access to the Internet only (i.e., if the user is not an appliance administrator 44) or full access (i.e., if the user is an appliance administrator 44). To determine if the user is an administrator 44, the user credentials are forwarded to the appliance 10, which triggers a verification process with IdP 44. Namely, the appliance credentials are verified with the online service 30 and with the IdP 44. If the credentials fail (i.e., the user is not recognized), the user 52 is again redirected to the captive portal. If the credentials succeed as a non-administrator, the user 52 is allowed access to the Internet only (i.e., fall back configuration 22). If the credentials are verified as an appliance administrator 44, the secret key is provided to the appliance 10 and user 52 is allowed full access.

Figure 4:
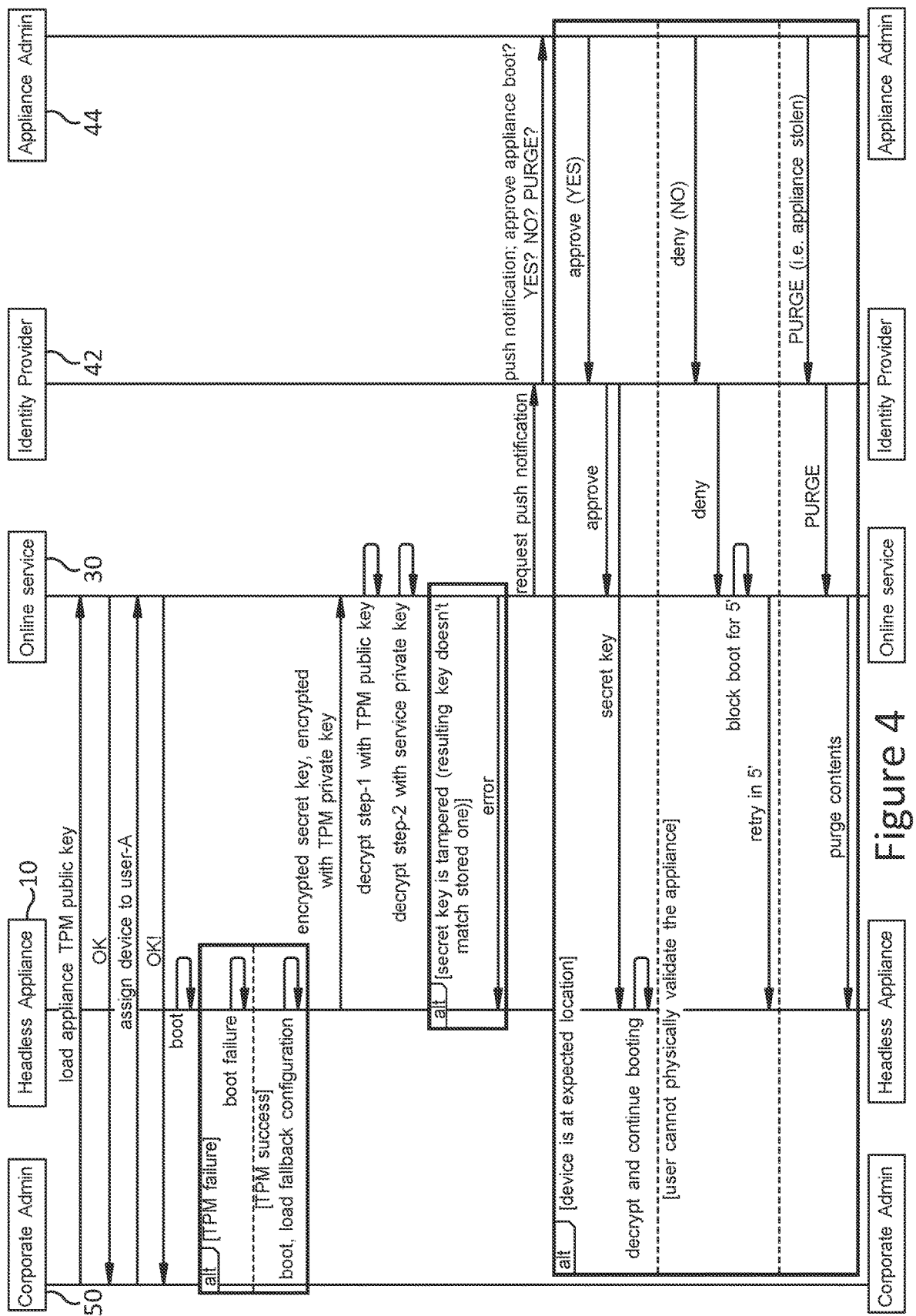

As noted, additional trust factors such as the use of a TPM chip 20 can be utilized as part of the process. FIG. 4 depicts an illustrative example using a TPM chip 20 to prevent tampering of the appliance software, via a secure boot, as well as prevent the software from executing in a different appliance, addressing software tampering and disk theft scenarios.

In this case, the TPM chip 20 holds a key (e.g., a TPM private key) and the corporate administrator 50 loads another key (e.g., the appliance TPM public key) onto the online service 30 and assigns the appliance 10 to an appliance administrator 44. When the appliance attempts to boot, a TPM check can either result in a failure that stops the boot process or a success, in which case the fallback configuration 22 is loaded. Assuming success, the encrypted key (e.g., secret key S'), which is encrypted with a private key (e.g., the TPM private key), is sent to the online service 30 where it is decrypted with a public key (e.g., the TPM public key) and then decrypted with the key. If an error is detected (i.e., secret keys do not match), an error is returned. If the keys match, a push notification is forwarded to the appliance administrator 44 from IdP 44 to approve the appliance boot. The appliance administrator 44 can then approve, deny or purge the request.

In this approach, the TPM chip 20 is leveraged to validate the appliance identity, preventing unsolicited requests to retrieve the secret key. The use of a TPM chip 20 however is enhanced by the current process, which prevents critical software functions such as establishment of connectivity to the secure network from executing until sanctioned by an appliance administrator 44, thus addressing the device theft use case, which a TPM chip 20 alone cannot protect against.

Figure 5:
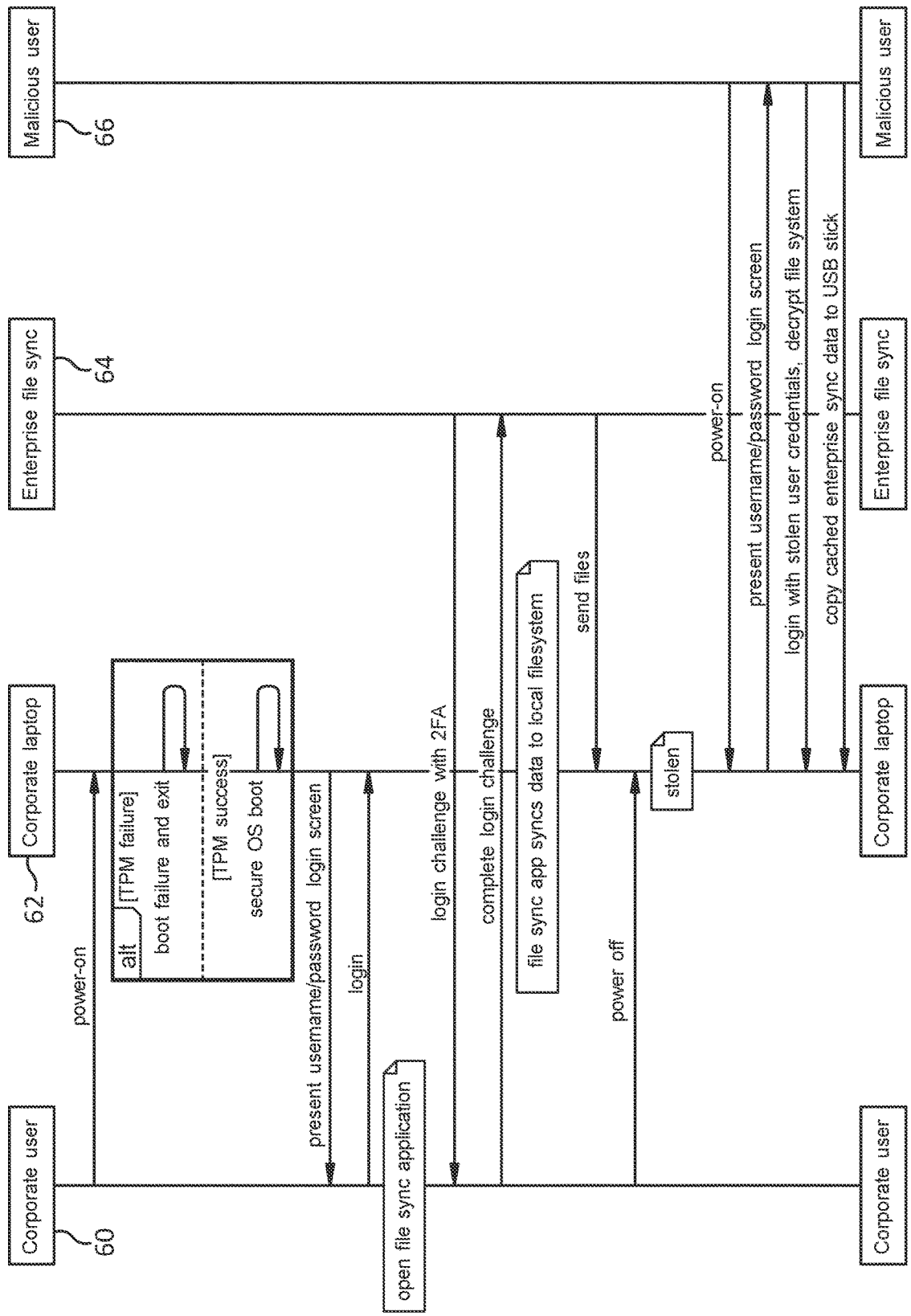
Figure 6:
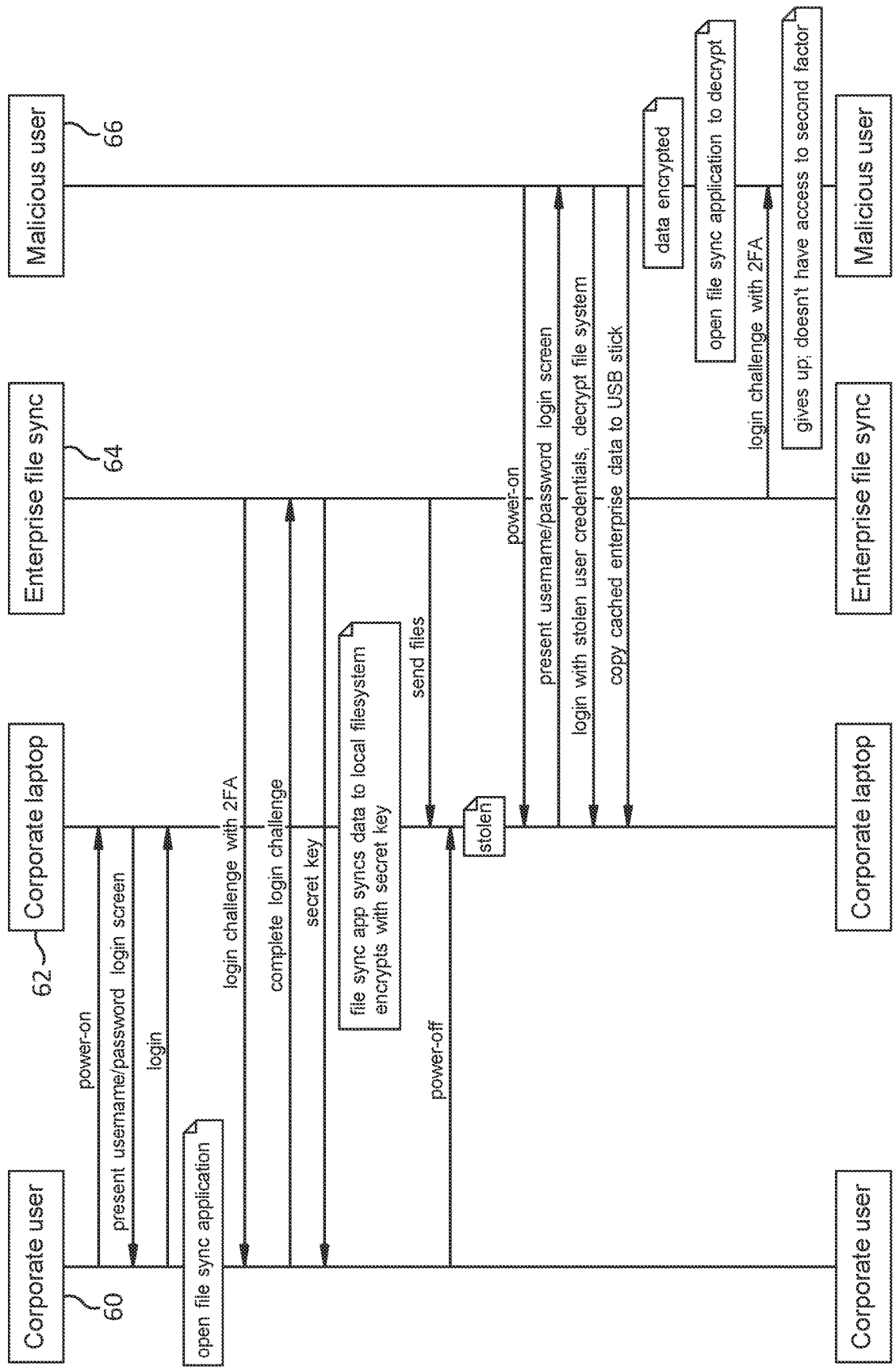

FIGS. 5 and 6 depict further alternative implementations that leverage user authentication as an alternative or supplementary process. For instance, there are well-known Network-Bound Disk Encryption techniques and implementations that provide for pluggable decryption schemes for headless devices. In such a case, the process described above would operate in a supplementary manner, i.e., only require user interaction through push notification and/or captive portal to decrypt if the headless appliance 10 is located outside the secure network.

Such alternative use cases could leverage the supplementary user authentication to decrypt when the appliance data-at-rest encryption capabilities are not considered sufficient. For example, consider an enterprise file sync application with a desktop client installed at employees' mobile devices (e.g., laptops). The enterprise file sync application provides for strong 2-factor authentication (2FA), however the employee laptops can be unlocked by a simple username/password combination. In case of equipment theft, this allows sensitive company data to leak, even if the employee laptop is protected by strong encryption.

FIG. 5 depicts a use case in which a corporate user 60 uses a laptop 62 protected by strong encryption offered by the operating system (OS). The OS itself is protected by TPM, which prevents any sort of OS tampering, whereas the user data are protected by login/password. In addition, an enterprise file sync application 64 synchronizes local enterprise data protected by 2FA, so that the user can interact offline with the data. This however introduces a security gap as data that is otherwise protected by 2FA can be retrieved by a malicious user 66 who steals the corporate appliance with only knowledge of the employee username and password.

In a manner similar to headless appliances, the current approach can be leveraged to provide additional encryption for such applications, on top of the one offered by the operating system. In FIG. 6, the enterprise data theft by a malicious user 66 is thwarted, because on top of the OS encryption, the enterprise file sync application 64 applies additional encryption, with a key (e.g., a secret key) stored in the cloud and protected by 2FA.

Figure 7:
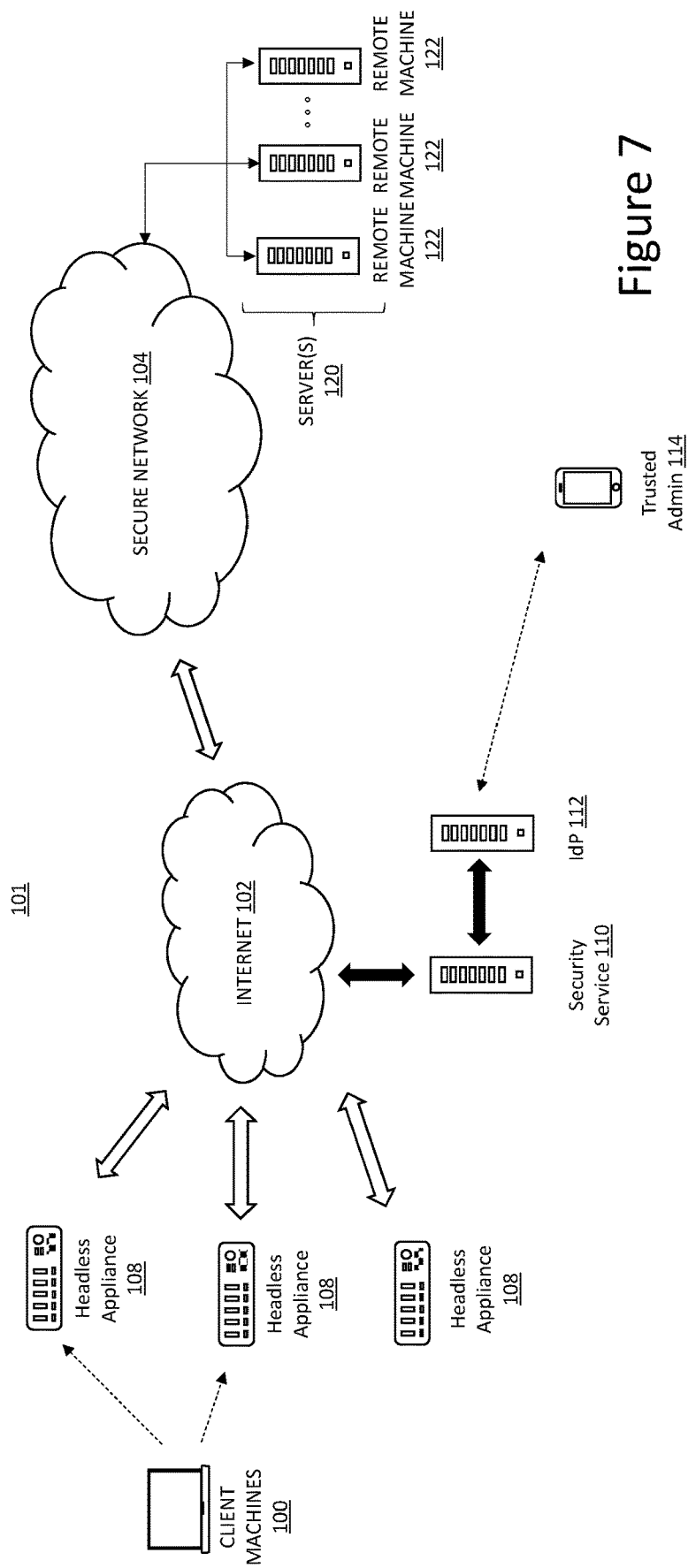
FIG. 7 depicts a network infrastructure, in accordance with an illustrative embodiment.

Referring to FIG. 7, a non-limiting network environment 101 in which various aspects of the disclosure may be implemented includes one or more headless appliances 108, one or more remote machines 122, the Internet 102, a secure network 104, a trusted admin device 114, and one or more services 110, 112 (e.g., also implemented by remote computing devices) installed within the computing environment 101. Headless appliances 108 may be implemented for any purpose, e.g., to provide network access, routing, virtual private networking, data processing, a control system, etc. In some cases, client machines 100 communicate with the remote machines 122 via an intermediary headless appliance 108. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple headless appliances 108 may be used, and the appliance(s) 108 may be deployed as part of a network.

The client machines 100 may be generally referred to as local machines, clients, client nodes, client computers, client devices, computing devices, endpoints, or endpoint nodes. The remote machines 122 may be generally referred to as servers 120 or a server farm. A server 120 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 120 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 122 may execute a remote presentation services program or other program that uses a thin-client or a remote-display protocol to capture display output generated by an application executing on a server 122 and transmit the application display output to a client device 100.

In yet other embodiments, a server 120 may execute a virtual machine providing, to a user of a client device 100, access to a computing environment. The client device 100 may be a virtual machine. The virtual machine may be managed by, for example, a hypervisor, a virtual machine manager (VMM), or any other hardware virtualization technique within the server 122.

In some embodiments, the secure network may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 8:
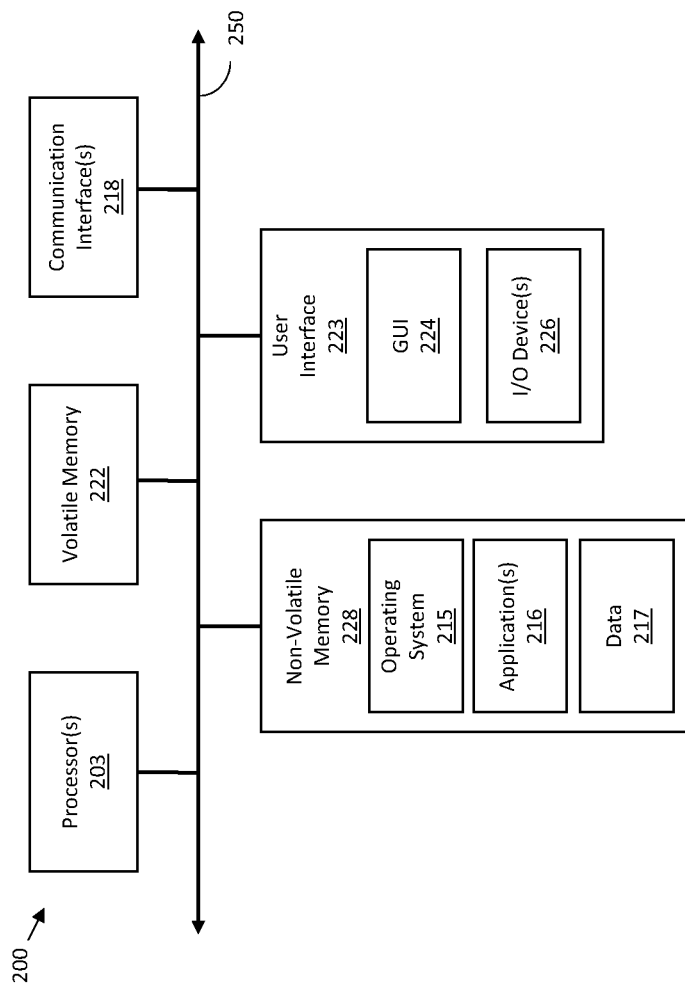
FIG. 8 depicts a computing system, in accordance with an illustrative embodiment.

FIG. 8 depicts a block diagram of a computing device 200 useful for practicing an embodiment of client machines 100, appliances 108 and/or servers 120. The computing device 200 includes one or more processors 203, volatile memory 222 (e.g., random access memory (RAM)), non-volatile memory 228, user interface (UI) 223, one or more communications interfaces 218, and a communications bus 250.

The non-volatile memory 228 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 223 may include a graphical user interface (GUI) 224 (e.g., a touchscreen, a display, etc.) and one or more input/output (I/O) devices 226 (e.g., a mouse, a keyboard, a microphone, one or more speakers, one or more cameras, one or more biometric scanners, one or more environmental sensors, and one or more accelerometers, etc.).

The non-volatile memory 228 stores an operating system 215, one or more applications 216, and data 217 such that, for example, computer instructions of the operating system 215 and/or the applications 216 are executed by processor(s) 203 out of the volatile memory 222. In some embodiments, the volatile memory 222 may include one or more types of RAM and/or a cache memory that may offer a faster response time than a main memory. Data may be entered using an input device of the GUI 224 or received from the I/O device(s) 226. Various elements of the computer 200 may communicate via the communications bus 250.

The illustrated computing device 200 is shown merely as an example client device or server, and may be implemented by any computing or processing environment with any type of machine or set of machines that may have suitable hardware and/or software capable of operating as described herein.

The processor(s) 203 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 203 may be analog, digital or mixed-signal. In some embodiments, the processor 203 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 218 may include one or more interfaces to enable the computing device 200 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 200 may also execute a terminal services session to provide a hosted desktop environment. The computing device 200 may provide access to a remote computing environment including one or more applications, one or more desktop applications, and one or more desktop sessions in which one or more applications may execute.

The following paragraphs (S1) through (S10) describe examples of systems and devices that may be implemented in accordance with the present disclosure.

(S1) A system may comprise appliance, comprising: a memory configured to store content, the content being encrypted with a key before deployment of the appliance, and the key being separately stored on a remote computing device; and a processor coupled to the memory and configured to boot the appliance according to a method that includes: initiating operation of the appliance in which the appliance allows establishment of connectivity with a network to communicate with the remote computing device and disallows access to a secure computing environment; receiving the key from the remote computing device in response to (i) establishment of trust between the appliance and the remote computing device and (ii) authentication of a user; and modifying operation of the appliance to allow the appliance to access the secure computing environment upon decryption of the content with use of the key.

(S2) A system may be configured as described in paragraph (S1), wherein the memory further includes an encrypted version of the key, encrypted using public key infrastructure.

(S3) A system may be configured as described in any of paragraphs (S1) or (S2), further comprising forwarding a request for the key to the remote computing device that independently utilizes an identity provider to authenticate the user, and wherein forwarding the request for the key includes forwarding an encrypted version of the key to the remote computing device to allow the remote computing device to establish trust with the appliance.

(S4) A system may be configured as described in any of paragraphs (S1)-(S3), wherein access to the secure computing environment is independent of access to the remote computing device.

(S5) A system may be configured as described in any of paragraphs (S1)-(S4), wherein initiating operation of the appliance provides access to the Internet and an ability to request the key from the remote computing device via the Internet.

(S6) A system may be configured as described in paragraph (S5), wherein the request for the key occurs synchronously in response to launching in the fallback mode.

(S7) A system may be configured as described in paragraph (S5), wherein the request for the key occurs asynchronously in response to an attempted connection to a secure network.

(S8) A system may be configured as described in any of paragraphs (S1)-(S7), further comprising a trusted platform module (TPM) chip to prevent tampering.

(S9) A system may be configured as described in any of paragraphs (S1)-(S8), wherein the appliance comprises a headless appliance that does not include a user interface.

(S10) A system may be configured as described in any of paragraphs (S1)-(S9), wherein the appliance comprises a router.

The following paragraphs (M1) through (M0) describe examples of methods that may be implemented in accordance with the present disclosure.

(M1) A computerized method for booting an appliance, comprising: providing the appliance with content stored in a memory, wherein the content is encrypted with a key, and wherein the key is separately stored on a remote computing device; initiating operation of the appliance in which the appliance allows establishment of connectivity with a network to communicate with the remote computing device and disallows access to a secure computing environment; receiving the key from the remote computing device in response to (i) establishment of trust between the appliance and the remote computing device and (ii) authentication of a user; and modifying operation of the appliance to allow the appliance to access the secure computing environment upon decryption of the content with use of the key.

(M2) A method may be performed as described in paragraph (M1), wherein the network appliance further includes an encrypted version of the key, encrypted using public key infrastructure.

(M3) A method may be performed as described in paragraph (M2), further comprising forwarding a request for the key to the remote computing device that independently utilizes an identity provider to authenticate the user, and wherein forwarding the request for the key includes forwarding an encrypted version of the key to the remote computing device to allow the remote computing device to establish trust with the appliance.

(M4) A method may be performed as described in any of paragraphs (M1)-(M3), wherein access to the secure computing environment is independent of access to the remote computing device.

(M5) A method may be performed as described in any of paragraphs (M1)-(M4), wherein initiating operation of the appliance provides access to the Internet and an ability to request the key from the remote computing device via the Internet.

(M6) A method may be performed as described in paragraph (M5), wherein the request for the secret key occurs synchronously in response to launching in the fallback mode.

(M7) A method may be performed as described in paragraph (M5), wherein the request for the secret key occurs asynchronously in response to an attempted connection to a secure network.

(M8) A method may be performed as described in any of paragraphs (M1)-(M7), wherein the network appliance further includes a trusted platform module (TPM) chip to prevent tampering.

(M9) A method may be performed as described in any of paragraphs (M1)-(M8), wherein the network appliance comprises a headless appliance that does not include a user interface.

(M10) A method may be performed as described in any of paragraphs (M1)-(M9), wherein the network appliance comprises a router.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A headless appliance that provides network access, comprising:

a memory configured to store content, the content being encrypted with a key before deployment of the headless appliance, the key being separately stored on a remote computing device; and a processor coupled to the memory and configured to perform a process that includes:

booting the headless appliance and loading a fallback configuration;

in response to a user device connecting to the headless appliance, directing the user device to a captive portal and capturing credentials of a user;

forwarding the credentials to the remote computing device for verification by an identity provider;

in response to the credentials being verified as a non-administrator, granting access to a public network for the user; and in response to the credentials being verified as an administrator, obtaining the key from the remote computing device to decrypt the content to provide access to a private network for the user.

2. The headless appliance of claim 1, wherein the headless appliance comprises a router.

3. The headless appliance of claim 1, wherein the public network comprises the Internet and the private network comprises a virtual private network.

4. The headless appliance of claim 1, wherein granting access to the public network for the user includes first authenticating an Internet Protocol (IP) address of the user device.

5. The headless appliance of claim 1, further comprising a trusted platform module (TPM) chip to prevent tampering.

6. The headless appliance of claim 1, wherein booting automatically initiates when powered on.

7. The headless appliance of claim 1, wherein the identity provider utilizes multi-factor authentication to determine whether the user is an administrator.

8. A computerized method for booting a headless appliance, comprising:

providing the headless appliance with content stored in a memory, wherein the content is encrypted with a key, and wherein the key is separately stored on a remote computing device;

booting the headless appliance and loading a fallback configuration;

in response to a user device connecting to the headless appliance, directing the user device to a captive portal and capturing credentials of a user;

forwarding the credentials to the remote computing device for verification by an identity provider;

in response to the credentials being verified as a non-administrator, granting access to a public network for the user; and in response to the credentials being verified as an administrator, obtaining the key from the remote computing device to decrypt the content to provide access to a private network for the user.

9. The method of claim 8, wherein the headless appliance comprises a router.

10. The method of claim 8, wherein the public network comprises the Internet and the private network comprises a virtual private network.

11. The method of claim 8, wherein granting access to a public network for the user includes first authenticating an Internet Protocol (IP) address of the user device.

12. The method of claim 8, wherein booting automatically initiates when powered on.

13. The method of claim 8, wherein the identity provider utilizes multi-factor authentication to determine whether the user is an administrator.

14. A headless appliance, comprising:
- a Trusted Platform Module (TPM) chip configured to store a private key, a corresponding public key being separately stored on a remote computing device;
- a memory configured to store an encrypted secret key, the secret key being encrypted with the private key, wherein a corresponding copy of the secret key is separately stored on the remote computing device; and
- a processor coupled to the memory and TPM chip and configured to perform a process that includes:
  - booting the headless appliance;
  - in response to the TPM chip not being tampered with, loading a fallback configuration;
  - forwarding the encrypted secret key to the remote computing device for decryption with the public key;
  - in response to a secret key match at the remote computing device, receiving the secret key from the remote computing device; and
  - decrypting content using the secret key to boot the headless appliance with a full configuration.

15. The headless appliance of claim 14, wherein, in response to the secret key match at the remote computing device, first forwarding a request notification from an identity provider to an administrator to approve booting with the full configuration.

16. The headless appliance of claim 15, wherein the administrator is provided with an option to approve, deny or purge contents of the headless appliance.

17. The headless appliance of claim 14, wherein in response to a secret key mismatch at the remote computing device, receiving an error condition from the remote computing device.

18. The headless appliance of claim 14, wherein booting automatically initiates when powered on.

19. The headless appliance of claim 14, wherein the identity provider utilizes multi-factor authentication to determine whether the user is an administrator.

20. The headless appliance of claim 14, wherein the full configuration provides access to a virtual private network.

* * * * *